United States Patent [19]
Svedin et al.

[11] Patent Number: 5,442,682
[45] Date of Patent: Aug. 15, 1995

[54] METHOD FOR REGISTERING TRAFFIC DATA IN A TELECOMMUNICATION SYSTEM

[75] Inventors: Lars-Erik Svedin, Ekerö ; Lars K. Lindén, Hästveda; Lars M. Andersson, Linköping; Cecilia S. M. Hedin, Stockholm; Ingrid V. Nordstrand, Sundbyberg; Stig R. Bodin, Spanga, all of Sweden

[73] Assignee: Telefonaktiebolaget LM Ericsson, Stockholm, Sweden

[21] Appl. No.: 360,124

[22] Filed: Dec. 20, 1994

Related U.S. Application Data

[63] Continuation of Ser. No. 84,487, Jul. 1, 1993, abandoned.

[30] Foreign Application Priority Data

Jul. 3, 1992 [SE] Sweden .................... 92020874

[51] Int. Cl.⁶ ............................ H04Q 7/22; H04Q 7/34
[52] U.S. Cl. .......................................... 379/59; 379/63; 455/33.1; 455/56.1
[58] Field of Search ................ 379/58, 59, 60, 63; 455/33.1, 33.2, 54.1, 54.2, 56.1

[56] References Cited

U.S. PATENT DOCUMENTS

| | | | |
|---|---|---|---|
| 4,775,999 | 10/1988 | Williams | 455/34.1 |
| 5,123,111 | 6/1992 | Delory et al. | 379/60 |
| 5,210,787 | 5/1993 | Hayes et al. | 377/60 |

FOREIGN PATENT DOCUMENTS 0465443 1/1992 European Pat. Off. .
WO88/08238 10/1988 WIPO .

OTHER PUBLICATIONS

Recommendation GSM 08.08, version 3.9.2, pp. 28, 51, and 82 (Feb. 10, 1990).

*Primary Examiner*—Dwayne D. Bost
*Assistant Examiner*—Michael B. Chernoff
*Attorney, Agent, or Firm*—Burns, Doane, Swecker & Mathis

[57] ABSTRACT

A method for registering traffic data from mobile stations in a mobile telecommunication system. The mobile telecommunication system includes mobile switching centers and connected with these, base station controllers, so-called primary- and secondary base station controllers. Base stations are connected to the base station controllers, each base station covering a cell and each base station controller thereby covering a cell area containing several cells. Traffic data from a selected mobile is stored in the primary base station controller of the mobile. A trace invocation message is sent from the primary base station controller to the secondary base station controller, via the mobile switching center, when the mobile moves to a cell handled by the secondary base station controller. Registration of traffic data is thereafter effected in the secondary base station controller.

10 Claims, 4 Drawing Sheets

METHOD FOR REGISTERING TRAFFIC DATA IN A TELECOMMUNICATION SYSTEM

This application is a continuation of application Ser. No. 08/084,487, filed Jul. 1, 1993, now abandoned.

TECHNICAL FIELD

The present invention relates to a method for registering in a mobile telecommunication system, traffic data deriving from mobile stations. The system includes at least one mobile services switching center, a visitor location register belonging to the switching center, at least two base station controllers connected to the switching center. At least one base station is connected to each controller, wherein the radio converse area of respective base stations is called a cell. A group of cells belonging to a switching center is called a service area, and a mobile station which enters said service area is registered in a visitor location register.

BACKGROUND OF THE INVENTION

When cellplanning a mobile telecommunication system, it is important to be able to register information about the traffic behaviour, i.e., it is important to be able to register traffic and measurement data that arrives from one or more mobile stations. When constructing a cell network, it is also important to be able to detect the presence of one or more mobiles in the vicinity of a border between two cells, in order to verify the earlier estimated radio coverage. It is also important to be able to study the intensity of the traffic in the cell when modifying the cell network, for instance, when wishing to divide a cell into two parts. Finally, it is often desirable to be able to study the behaviour of a given type of mobile, so as to enable a comparison to be made with other types of mobile stations, for instance.

WO 88/08238 discloses a method of registering mobile stations in a mobile telecommunication system and therewith determine the geographical location of the mobile. A method of registering traffic data from one or more mobile stations located within a group of cells controlled by a base station controller while a call is in progress is also known from GSM-recommendation 08.08. A message "trace invocation" is ordered by an order command in a switching central to be sent to the base station controller as soon as a call has been connected to the selected mobile station. Registration of traffic data from the mobile is commenced upon receipt of the "trace invocation" message by the base station controller, and the traffic data is stored in a database in the base station controller. The traffic data to be stored in the database has earlier been determined in response to a storage command in the base station controller and may have the frequency used by the mobile or when the mobile from one cell to another within the cell area controlled by the base station controller, i.e., when so-called inter-BSC-handover takes place. One problem with this known technique is that registration of traffic data ceases at the time the mobile leaves the cell area of the base station controller, i.e., after a so-called inter-BSC-handover. Another problem with this known technique is that when a storage command is preinserted in the base station controller, prior to having received the "trace invocation" command, it is necessary to determine the type of traffic data to be registered. This predetermined type of traffic data will then apply to traffic data from all selected mobile stations.

DISCLOSURE OF THE INVENTION

The aforesaid problems are solved in accordance with the present invention by dispatching a message "trace invocation" from a primary base station controller to a secondary base station controller via a switching center, when a mobile station from which data registration is requested passes a boundary between two cells which are controlled by different base station controllers, i.e., when an inter-BSC-handover takes place from the primary base station controller to a secondary base station controller. Registration of traffic data then continues in the secondary base station controller. According to the present invention, the message "trace invocation" contains an argument which discloses which traffic data arriving from the mobile shall be registered.

The method is characterized by the features set forth in the following method claims.

DETAILED DESCRIPTION

Figure 1:
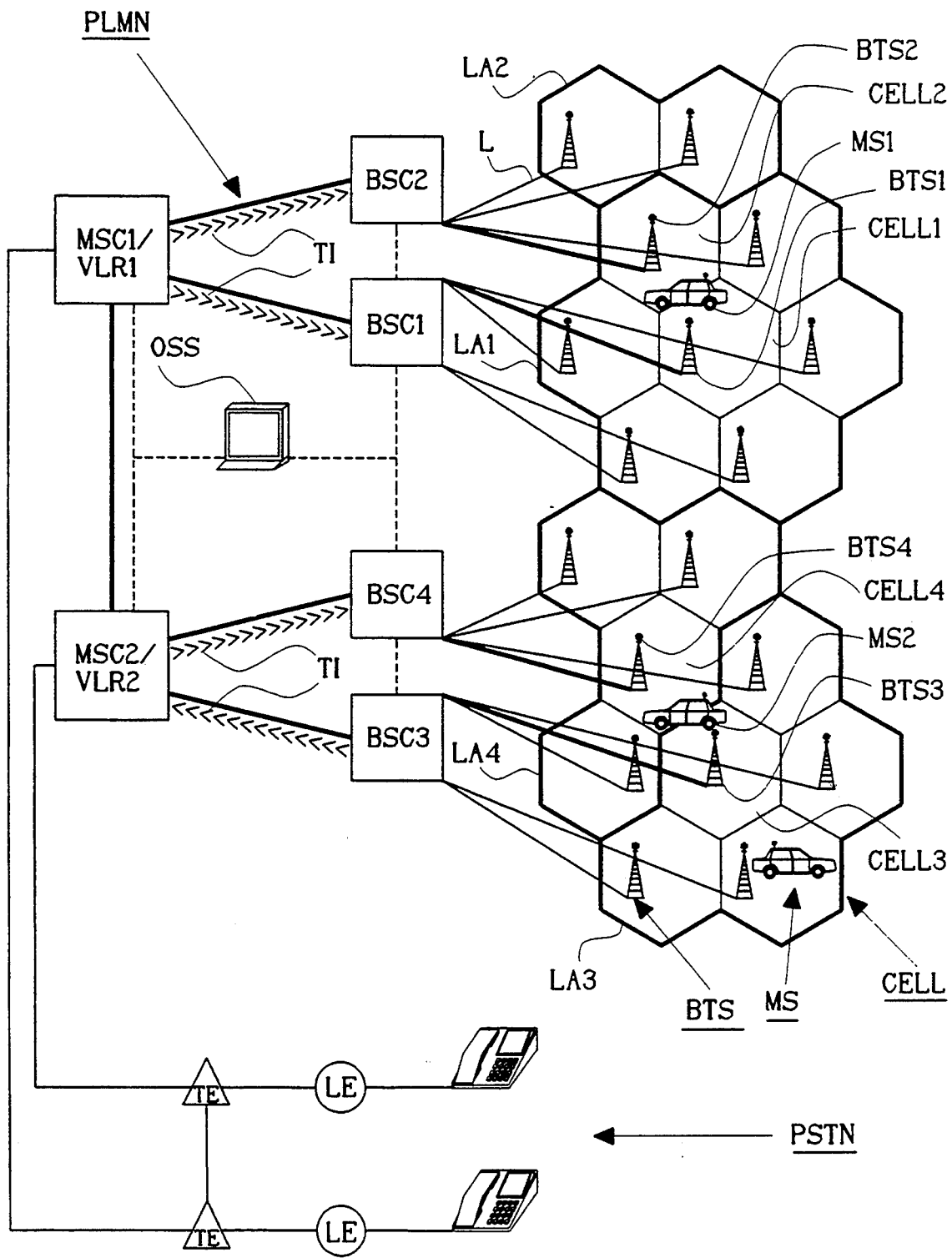
FIG. 1 illustrates schematically and from above a typical telecommunication network and a typical mobile telephone system.

FIG. 1 illustrates a GSM-type mobile telephone network PLMN which is connected to a general telephone network PSTN. Local subscribers in the general telephone network are connected to local exchanges LE, which distribute calls to and from the local subscribers. Calls are connected further to mobile switching centers MSC in the mobile telephone network, through the agency of transit exchanges TE. The mobile telephone network PLMN used in the exemplifying embodiments includes a first and a second mobile switching center MSC1, MSC2, whose main purpose is to distribute calls to base station controllers BSC and to handle handovers when a mobile station MS crosses a boundary between two cells controlled by different base station controllers, these handovers being described in more detail herebelow. The first switching center MSC1 is connected by cables to a first and a second base station controller BSC1, BSC2, and the second switching center is similarly connected to a third and a fourth base station controller BSC3, BSC4. The main purpose of the base station controllers is to monitor and administer base stations BTS and to distribute calls from the switching centers MSC to the mobile stations MS. Each of the base station controllers BSC is connected to a plurality of base stations BTS, wherein in the case of the FIG. 1 embodiment, the first and the third base station controllers BSC1, BSC3 are each connected to five base stations by cables L. The second and the fourth base station controllers BSC2, BSC4 are similarly connected to each of four base stations. The base stations include the radio equipment necessary to establish radio communication with the mobile stations MS. Each base station transmits radio signals, where the radio covering area of each base station is designated as a cell, CELL. The base stations BTS are dispersed geographically in order to meet traffic needs on coverage and capacity. The total radio covering cell area associated with a particular switching center MSC is referred to as the service area. This service area is, in turn, divided into localizing areas, which are bordered by heavy cell-encompassing lines in the FIG. 1 illustration. A first location area LA1 includes five cells which are handled by the first base station controller BSC1, and two cells which are handled by the second base station controller BSC2. A second location area LA2 includes two cells which are handled by the second base station controller. A third location area LA3 includes four cells which are handled by the third base station controller BSC3, and one cell which is handled by the fourth base station controller BSC4. A fourth localizing area LA4 includes a cell which is handled by the third base station controller, and three cells which are handled by the fourth base station controller. FIG. 1 also shows that the first switching center MSC1 includes a first visitor location register VLR1, and that the second switching center MSC2 includes a second visitor location register VLR2. All those mobile stations which are handled by the switching center connected to the register (at any particular time) are registered in the visitor location registers VLR, i.e., all mobiles which are located within the service area of the switching centers. FIG. 1 also illustrates an operator unit OSS, which is connected to all mobile switching centers MSC1, MSC2 and base station controllers BSC1, BSC2, BSC3, BSC4, so as to enable these (mobile switching centers) and controllers to be controlled and monitored with the aid of control commands issued from a central station, such as a control room, for instance.

Figure 2:
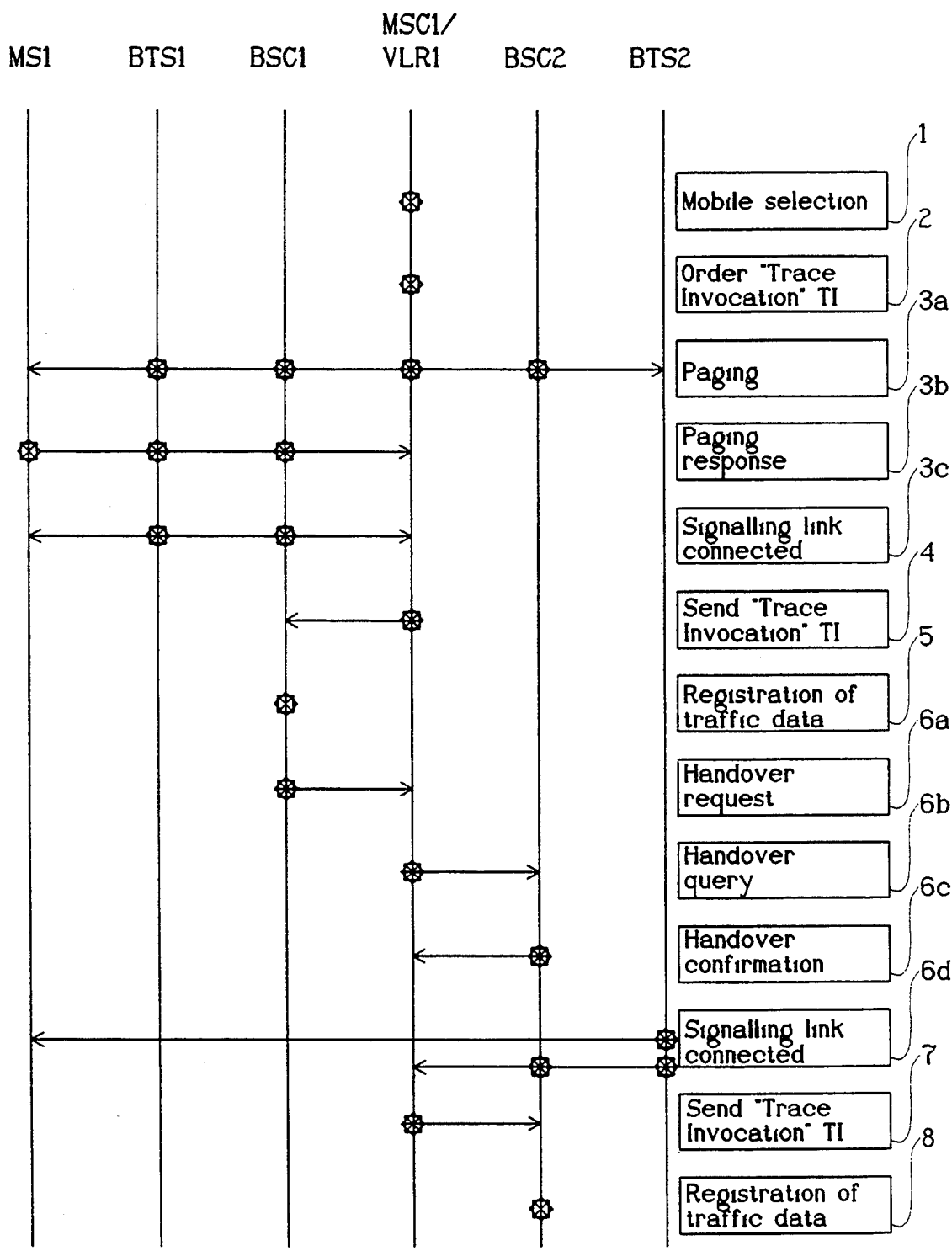
FIG. 2 is a flow diagram of an inventive method and illustrates an MSC-ordered trace invocation.

The above-described mobile telecommunication system operates in accordance with the GSM-recommendations, although the present invention, which will now be described, can also be used in similar types of systems. As before mentioned, it is important that traffic data can be registered from one or more mobile stations in cell scheduling processes, for instance. The inventive method illustrated in FIG. 2 is referred to as an MSC-ordered trace invocation and is described below:

Using a select command 1, an operator selects from the visitor location register VLR1, a mobile station MS1 from which traffic data registration is desired. The mobile station is registered in the visitor location register immediately after the mobile enters one of the location areas LA1, LA2 of the switching center.

Using an order command 2 from a terminal which is connected to the switching center MSC1, the operator orders the switching center to send a message "trace invocation" TI to that base station controller (which controls the area) in which the mobile station is located, immediately and every time a call connection has been established with the selected mobile MS1. The order command includes parameters which disclose the mobile station MS1 from which registering shall take place, the type of traffic data to be registered, and information as to when registration of the traffic data shall begin. The message "trace invocation" TI will be described in more detail later on.

The mobile switching center MSC1 sends a paging message 3a to all base stations BTS which belong to the location area LA1 in which the mobile is located according to the visitor location register VLR1, so as to connect the call from the general network PSTN to the selected mobile station MS1. The base stations send the paging message to those mobile stations that are located within the cell area of the respective base stations. The selected mobile MS1 confirms the message, by sending a paging response message 3b to the base station BTS1 in whose cell, CELL1, the mobile is located. The paging response message 3b is then sent from the base station BTS1 to the switching center MSC1, via the base station controller BSC1. The switching center therewith obtains information as to the base station controller BSC1 which handles the cell in which the selected mobile station MS1 is located. The call is now connected with the mobile MS1, via the primary base station controller BSC1 in accordance with block 3c.

The earlier commanded and stored message "trace invocation" TI is transmitted in accordance with block 4, through the agency of a start condition which is triggered when calls are connected to the mobile MS1. The message is sent from the switching center MSC1 to the base station controller BSC1, called the primary base station controller, which controls the cell, CELL1, called the primary cell, in which the mobile station MS1 is located.

Registration 5 of traffic data from the mobile MS1 is effected in the primary base station controller in accordance with the desiderata pre-specified in the message "trace invocation" TI, provided that the call is connected and that the mobile is located within a cell area that is controlled by the primary base station controller BSC1. Traffic data is herewith stored in a database in the primary base station controller.

When mobile station MS1 approaches another cell, CELL2, called the secondary cell, which is controlled by another base station controller, BSC2, hereinafter called the secondary base station controller the primary base station controller BSC1 requests a handover from the primary cell, CELL1, to the secondary cell, CELL2, by sending a message "handover request" 6a to the switching center MSC1. After receiving the "handover request", the switching center sends a message "handover query" 6b to the secondary base station controller BSC2, which after a successful takeover of the mobile from the primary base station controller BSC1 sends a "handover confirmation" message 6c to the mobile switching center MSC1. The mobile MS1 now converses via the secondary base station controller BSC2, in accordance with block 6d.

After the successful handover of the mobile station MS1 from the primary base station controller BSC1 to the secondary base station controller BSC2, the mobile switching center sends the earlier stored "trace invocation" message TI to the secondary base station controller BSC2 on the basis of the handover confirmation 6c, in accordance with block 7.

Registration 8 of traffic data from the mobile station MS1 is effected in the secondary base station controller BSC2 in accordance with the desiderata earlier specified in the "trace invocation" message TI, provided that the call is connected and that the mobile is located within a cell area that is controlled by the secondary base station controller BSC2. Traffic data is herewith stored in a database in the secondary base station controller. The inventive switching of the "trace invocation" message TI between two base station controllers can according to the preferred embodiment be repeated, provided that a call is connected and that the mobile is located within the service area of the mobile switching center.

Figure 3:
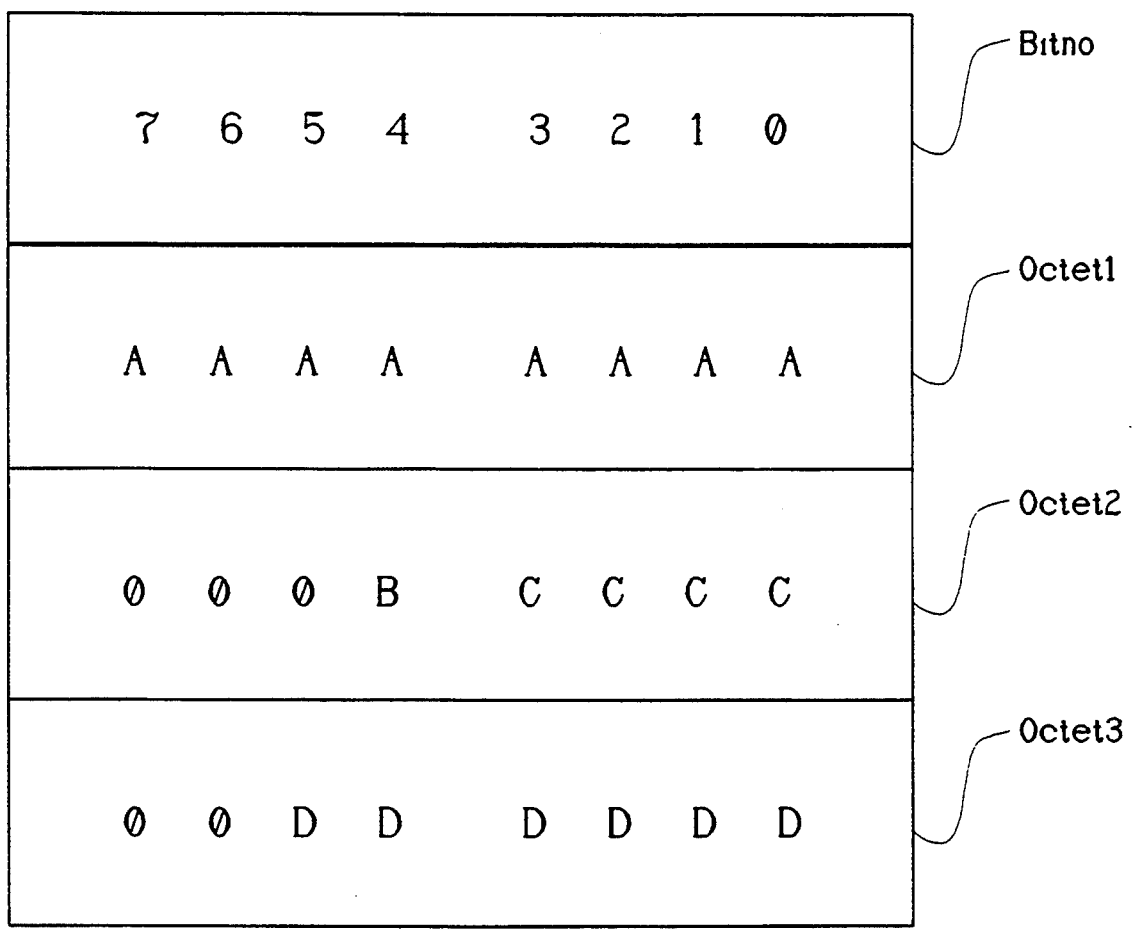
FIG. 3 illustrates the construction of a message "trace invocation".

The aforesaid "trace invocation" message TI will now be described in greater detail. Selected parts of the parameters in the order command 2 "Order Trace Invocation" are rearranged in accordance with the present invention and placed in the message "trace invocation" in accordance with FIG. 3. The message has three octets, where octet 1 contains a number which is specific to the message "trace invocation" TI. Octet 2 discloses from where "trace invocation" has been ordered, i.e., in this case from the switching center MSC1. Octet 2 also specifies those occasions on which registration is desired, which in the case of the illustrated embodiment shall take place on those occasions on which the mobile station crosses cell boundaries. Octet 3 contains a registration reference which identifies the mobile station, i.e., in this case the selected mobile station MS1. The uppermost row of bit numbers in FIG. 3 is not included in the message "trace invocation" TI, but merely shows the eight positions in the octets. Reference A in octet 1 denotes the trace invocation message number, reference B denotes whether trace invocation has been ordered by a mobile switching center or by a base station controller, reference C denotes what is to be registered, and reference D denotes a registration reference which is a replacement for the telephone number of the mobile station. Other positions in the message are marked with zeros (0). It is to be noted that the structure of the message "trace invocation" described above is just an example of such structure and the message is not limited to the message with the same notation described in the GSM-recommendations quoted earlier.

Figure 4:
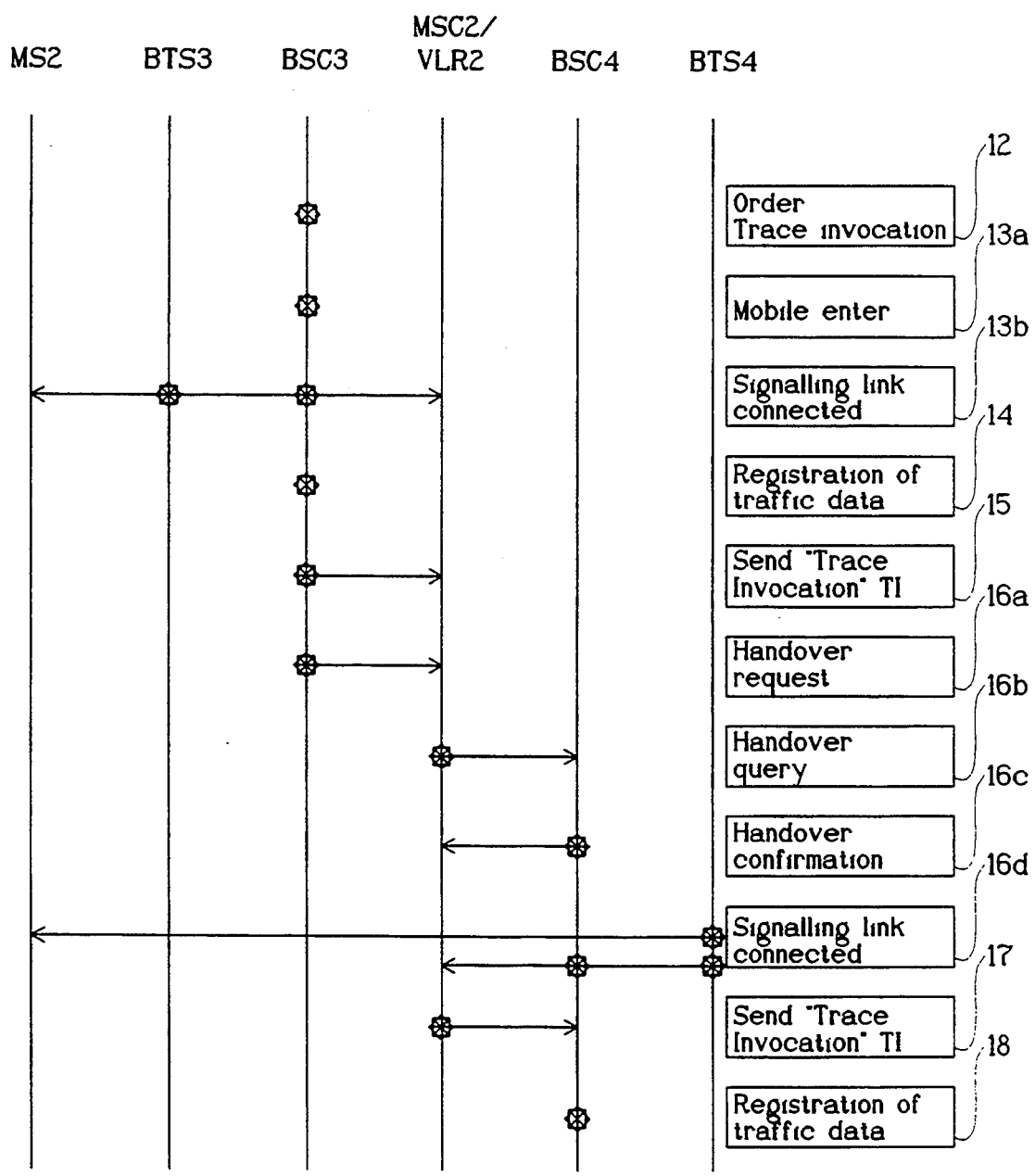
FIG. 4 is a flow diagram of an inventive method in conjunction with a BSC-ordered trace invocation.

Another exemplifying embodiment of the present invention will now be described. As before mentioned, it is important to be able to register traffic data from one or more mobile stations when scheduling cells, for instance. The inventive method illustrated in FIG. 4 is referred to as a BSC-ordered trace invocation. An operator situated at a base station controller BSC3 does not have access to the visitor location register VLR2 and cannot therefore select a specific mobile station located within a cell area controlled by the base station controller. Consequently, with BSC-ordered trace invocation, there is used a more collective registration criterion where it is irrelevant which mobile station precisely fulfils the criterion. The inventive method is described below.

An operator chooses to register all mobile stations that cross a boundary between two cells, CELL3 and CELL4, that are handled by different base station controllers BSC3, BSC4. The operator wishes to know the signal strength both before and after the cell change. The mobile stations are generally referenced as MS.

Using an order command 12 from a terminal connected to the base station controller BSC3, the operator orders the base station controller BSC3 to register traffic data from mobiles that have established call connections, as soon as these mobiles have entered the cell area which is handled by the base station controller. The order command 12 contains parameters which disclose the type of traffic data to be registered and also information as to when the registration shall begin. According to the present invention, selective parts of the parameters in the command are rearranged and placed in the message "trace invocation" TI. The "trace invocation" message TI has the same structure as the message in the earlier described embodiment, although the content of the message differs slightly. The "trace invocation" message will be described in more detail later on.

The mobile station MS2 to which a call has been connected enters 13a in the cell area of the base station controller BSC3. The base station controller BSC3 is hereinafter called the primary base station controller and the mobile MS2 now receives its call via the primary base station controller, in accordance with block 13b.

Registration 14 of traffic data from the mobile MS2 is effected in the primary base station controller in accordance with the desiderata earlier specified in the order command 12 and the message "trace invocation" TI, provided that the call is connected and that the mobile is located within the cell area that is controlled by the primary base station controller BSC3. Traffic data is herewith stored in a database in the primary base station controller.

When mobile station MS2 located in the cell, CELL3, called the primary cell, approaches another cell, CELL4, called the secondary cell, which is controlled by another base station controller BSC4, called the secondary base station controller the primary base station controller sends the message "trace invocation" 15 to the switching center MSC2. At the same time, the primary base station controller requests handover from the primary cell, CELL3, to the secondary cell, CELL4, by sending a "handover request" message 16a to the switching center MSC2. Upon receipt of the "handover request", the switching center sends a "handover query" message 16b to the secondary base station controller BSC4, which after successful takeover of the mobile from the primary base station controller BSC3 sends a message "handover confirmation" 16c to the mobile switching center MSC2.

The mobile MS2 now converses via the secondary base station controller BSC4, in accordance with block 16d.

Subsequent to successful takeover of the mobile station MS2 from the primary base station controller BSC3 to the secondary base station controller BSC4, the mobile switching center sends the message "trace invocation" TI to the secondary base station controller BSC4 in response to the handover confirmation 16c, in accordance with block 17. The message "trace invocation" TI is not stored in the mobile switching center MSC2.

The registration 18 of traffic data from the mobile station MS2 is effected in the secondary base station controller BSC4 in accordance with the desiderata earlier specified in the message "trace invocation" TI, provided that the call has been connected and the mobile is located within a cell area that is controlled by the secondary base station controller. Traffic data is herewith stored in a database in the secondary base station controller. The inventive switching of the message "trace invocation" TI between two base station controllers can according to the preferred embodiment be repeated for as long as a call is connected and for as long as the mobile is located within the service area of the mobile switching center.

The above-mentioned message "trace invocation" TI will now be described in greater detail. According to the present invention, selected parts of the parameters in the order command 12 "Order Trace Invocation" are rearranged and placed in the message "trace invocation" in accordance with FIG. 3 The message "trace invocation" TI has the same structure as the message described with reference to the preceding embodiment, although the content of the message differs slightly. Octet 2 discloses information as to from where "trace invocation" was ordered, which in the present case is from base station controller BSC3. Octet 2 also specifies the occasions on which registration is desired, which in the present case is when the mobiles MS approach a given cell boundary. Octet 3 includes a registration reference which identifies the selected mobile stations, i.e., in the present case all mobile stations to which a call has been connected and which are located within the cell area controlled by the base station controller BSC3.

It will be understood that the aforedescribed exemplifying embodiments of the invention can be varied and modified without departing from the scope of the present invention. For instance, traffic data may consist of all information transmitted between a mobile station and a base station controller. The terminal cited in the exemplifying embodiments need not be a local data unit connected to a specific switching center or base station controller, but may be a centrally located operator system OSS that is connected to all switching centers and base station controllers of the mobile telecommunication system. After the tracing process, traffic data can be collected from databases and read-out in the operator system. In the case of the exemplifying embodiments, the message "trace invocation" is created in response to an order command from the operator. Alternatively, the message can be generated by a program in the switching center, the base station controller or the operator system which is activated at a given time point or by some other criterion. The message "trace invocation" TI created in accordance with FIG. 3 is to be considered only as an example of such message. It should also be understood that the signalling described with reference to the exemplifying embodiments and illustrated in FIG. 2 and FIG. 4 is only representative of the signalling which is of interest to the present invention and does not represent the total amount of signalling that takes place on the aforedescribed occasions. One skilled in the art, realize of course that the trace method according to the invention is not limited to only one service area. The method can also be utilized when a mobile moves from one service area to another. It will also be understood that the invention is not restricted to the aforedescribed and illustrated exemplifying embodiments thereof and that modifications can be made within the scope of the following claims.

We claim:

1. A method for registering traffic data from mobile stations in a mobile telecommunication system which includes at least one mobile switching center, a visitor location register connected to the switching center, at least two base station controllers connected to the switching center, each of said base station controllers being connected to at least one base station, wherein the radio covering area of respective base stations is called a cell and a group of cells belonging to a switching center is called a service area, and wherein, subsequent to a mobile station entering said service area, the mobile station is registered in the visitor location register, said method comprising the steps of:

selecting at least one of the mobile stations from said visitor location register;

determining, by specifying a trace invocation message, the type of traffic data to be registered, which data arises during the registration;

ordering the switching center to send the trace invocation message to the base station controller which handles the cell group in which the selected mobile station is located;

fulfilling a start condition, wherein a call is connected to the selected mobile station;

sending the trace invocation message from the switching center to a primary base station controller which handles the cell in which the selected mobile station is located;

storing in a database in the primary base station controller traffic data incoming from the selected mobile station;

sending the earlier specified trace invocation message, when the selected mobile station crosses a boundary between two cells handled by different base stations controllers, from the switching center to a secondary base station controller which handles the cell in which the selected mobile station is now located so as to continue registering the traffic data as originally specified by the trace invocation message; and storing the a database in the secondary case station controller traffic data incoming from the selected mobile station.

2. A method for registering traffic data from mobile stations in a mobile telecommunication system which includes at least one mobile switching center, at least two base station controllers connected to the switching center, each of said base station controllers being connected to at least one base station, where the radio covering area of respective base stations is called a cell, said method comprising the steps of:

determining, by specifying a trace invocation message, the type of traffic data to be registered, which data arises during the registration;

ordering, by giving an order command to a primary station controller in which a selected mobile station is located, said base station controller to create the trace invocation message;

fulfilling start conditions at the selected mobile station;

storing traffic data incoming from the mobile station in a database in the primary base station controller;

sending the trace invocation message from the primary base station controller to the switching center;

sending the earlier specified trace invocation message, when the mobile station crosses the boundary between said two cells, from the switching center to a secondary base station controller which handles the cell in which the selected mobile station is now located so as to continue registering the traffic data as originally specified by the trace invocation message; and storing traffic data from the selected mobile station in a database in the secondary base station controller.

3. A method according to claim 1, wherein a predetermined number of binary digits which discloses which traffic data from the mobile station shall be stored in the database are included in the trace invocation message.

4. A method according to claim 3, wherein the commands are sent from an external unit connected to the switching centers and the base station controllers.

5. A method according to claim 4, wherein the commands are generated when an established criterion has been fulfilled in a program, said program being located in either the switching center, the base station controller, or the external unit.

6. A method according to claim 5, wherein traffic data stored in the database is collected and read-out by the external unit.

7. A method according to claim 2, wherein a predetermined number of binary digits which discloses which traffic data from the mobile station shall be stored in the database are included in the trace invocation message.

8. A method according to claim 7, wherein the commands are sent from an external unit connected to the switching centers and the base station controllers.

9. A method according to claim 8, wherein the commands are generated when an established criterion has been fulfilled in a program, said program being located in either the switching center, the base station controller, or the external unit.

10. A method according to claim 9, wherein traffic data stored in the database is collected and read-out by the external unit.

* * * * *